(12) United States Patent
Looper (10) Patent No.: US 12,154,246 B1
(45) Date of Patent: Nov. 26, 2024

(54) SYSTEMS AND METHODS FOR DISTRIBUTED THREE-DIMENSIONAL CONTENT GENERATION

(71) Applicant: Illuscio, Inc., Culver City, CA (US)

(72) Inventor: Sean Looper, Flagstaff, AZ (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/760,354

(22) Filed: Jul. 1, 2024

(51) Int. Cl.
*G06T 19/20* (2011.01)

(52) U.S. Cl.
CPC ...... *G06T 19/20* (2013.01); *G06T 2219/2004* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2018/0318014 A1* | 11/2018 | Gangwar | G06T 7/73 |
| 2022/0066901 A1* | 3/2022 | Bhorkar | H04L 41/5009 |
| 2022/0245904 A1* | 8/2022 | Saxena | G06F 11/3419 |
| 2024/0013457 A1* | 1/2024 | Savvides | G06V 20/50 |

* cited by examiner

*Primary Examiner* — Kee M Tung
*Assistant Examiner* — Jed-Justin Imperial
(74) *Attorney, Agent, or Firm* — Ansari Katiraei LLP; Arman Katiraei; Sadiq Ansari (57) ABSTRACT

Systems and associated methods are provided for distributed three-dimensional (3D) content generation whereby different 3D assets for a 3D scene are generated by different asset generators at different network tiers according to the latency sensitivity of each 3D asset. The system retrieves a 3D asset for the requested 3D scene, and differentiates a first 3D asset that is latency sensitive from a second 3D asset that is latency tolerant. The system generates the first 3D asset with a first asset generator at a first network tier, and generates the second 3D asset with a second asset generator at a more distant second network tier. The system distributes the generated primitives for the first 3D asset to the user device with a first amount of latency and the generated primitives for the second 3D asset to the user device with a second amount of latency.

20 Claims, 6 Drawing Sheets

SYSTEMS AND METHODS FOR DISTRIBUTED THREE-DIMENSIONAL CONTENT GENERATION

BACKGROUND

Remote access to three-dimensional (3D) games and interactive content is challenging because of the extremely limited amount of time available to generate and transmit the large amounts of 3D data needed to create a seamless or continuous experience. For instance, when a user provides an input for interacting with an element in a 3D scene or for changing the field-of-view, the input is transmitted from the user device across a data network to a server. The server generates the entire 3D scene anew with the changes caused by the user input, renders a two-dimensional (2D) image or frame based on the generated 3D scene, and transmits the rendered 2D image to the user device back across the network. A seamless or continuous experience is created when these operations are completed 30 times per second. In other words, the server has approximately 33 milliseconds to receive the input, process the input, generate the updated 3D scene, render the updated 3D scene, and send the rendered results for the 3D updated scene to the user device.

The network latency associated with the exchange of the user input, the rendered data, and/or other data between the user device and the server in the network core or "cloud" often exceeds tens of milliseconds. To reduce the network latency and improve the user experience, Points-of-Presence (PoPs) with newest generation hardware resources (e.g., Graphical Processing Units) are deployed to different network edges or different network locations that are geographically proximate to different groups of users. The PoPs are expensive and are associated with significant inefficiencies. Each POP at the network edge benefits the limited set of users that are geographically proximate to that PoP. Accordingly, several such PoPs at different network edges are needed in order to provide the same latency reductions to all users in all regions. Also, since the benefits are limited to the geographically proximate set of users, the resources of the network edge PoPs may be underutilized or unused for large amounts of time.

DETAILED DESCRIPTION OF PREFERRED EMBODIMENTS

The following detailed description refers to the accompanying drawings. The same reference numbers in different drawings may identify the same or similar elements.

Systems and associated methods are provided for distributed three-dimensional (3D) content generation. The distributed 3D content generation partitions the task of generating different 3D assets for a 3D scene to different asset generators that are located at different network tiers and are associated with different network latency. Specifically, the 3D asset generation tasks are distributed based on a latency sensitivity associated with each 3D asset in the 3D scene. 3D assets that are latency sensitive because they require frequent changes or have a high likelihood of being interacted with are assigned to asset generators at the network edge so that those latency sensitive 3D assets may be updated in less time and/or with less network latency than other 3D assets of the 3D scene that are assigned and generated by asset generators at network tiers that are further removed from the network edge.

The distributed 3D content generation is implemented by a 3D interactive system. The3D interactive system creates 3D experiences or interactive 3D content that are seamlessly accessed over a data network from one or more remote sites by prioritizing the updating of the 3D assets that are affected by latency over the updating of the 3D assets that are less affected by latency. Users do not notice a difference in the final rendering as the 3D assets that frequently change are changed with the required frequency based on the prioritization.

The 3D interactive system and the distributed 3D content generation reduce costs for remotely accessed 3D games or interactive 3D content as no single asset generator at the network edge is responsible for generating and/or updating all 3D assets of a 3D scene. Large portions of the 3D scene may be generated and/or updated using hardware resources of asset generators that are removed from the network edge. Moreover, the asset generators are not responsible for the resource intensive task of rendering each 3D scene. The asset generators generate the 3D primitives for the 3D scene, and send the 3D primitives to the user device for a localized rendering of the 3D scene. Consequently, the distributed 3D content generation significantly lessens load at each network edge by shifting a large portion of the 3D content generation tasks deeper into the network where hardware resource access is less expensive and more shareable relative to the hardware resource access at the network edge and by shifting the rendering overhead to the user devices.

Figure 1:
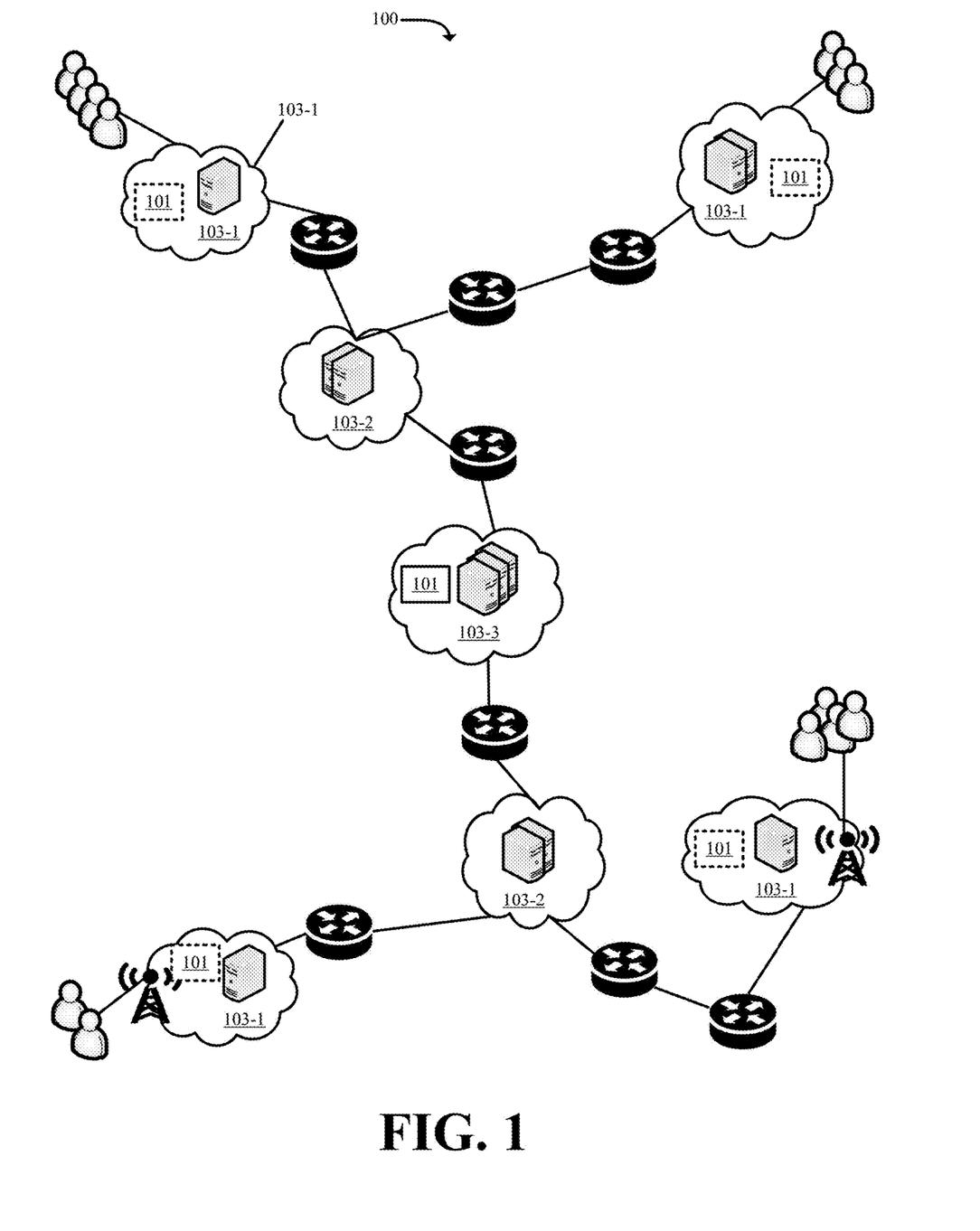
FIG. 1 illustrates an example architecture for a three-dimensional (3D) interactive system that performs the distributed 3D content generation in accordance with some embodiments presented herein.

FIG. 1 illustrates an example architecture for 3D interactive system 100 that performs the distributed 3D content generation in accordance with some embodiments presented herein. 3D interactive system 100 includes controller 101, first-tier asset generators 103-1, second-tier asset generators 103-2, and third-tier asset generators 103-3 (hereinafter collective referred to as "asset generators 103" or individually referred to as "asset generator 103"). In some embodiments, 3D interactive system 100 includes fewer or additional tiers of asset generators 103.

In some embodiments, controller 101 is a low overhead or lightweight instance that is collocated with first-tier asset generators 103-1 at each network edge Point-of-Presence (POP). In some other embodiments, a single instance of controller 101 is located at the network core or in the "cloud".

Controller 101 controls the distribution of the 3D asset generation tasks to asset generators 103 at the different network tiers. In some embodiments, controller 101 receives user device requests to access different interactive 3D content such as 3D games, 3D experiences in which the user controls the field-of-view, and/or other spatial computing experiences. Controller 101 analyzes the 3D assets of the requested interactive 3D content, prioritizes each 3D asset based on a determined latency sensitivity of that 3D asset, and allocates different asset generators 103 at different network tiers to generate and update the 3D assets based on the prioritization.

In some embodiments, controller 101 serves as the endpoint through which the 3D assets that are generated and updated by different asset generators 103 are streamed to the user device and/or the endpoint for receiving user input that creates a change in the interactive 3D content. Controller 101 may forward the user input to each asset generator 103 that is tasked with generating and updating one or more 3D assets for the interactive 3D content, or may selectively forward the user input to a particular asset generator 103 that updates a 3D asset affected by the user input.

Asset generators 103 are deployed at different locations within a data network. First tier asset generators 103-1 are located in PoPs that are closest to network points-of-access for different groups of users. In other words, first tier asset generators 103-1 are located the fewest network hops from specific geographic regions than second tier asset generators 103-2 and third tier asset generators 103-3. In some embodiments, user devices in the geographic regions that are proximate to first tier asset generators 103-1 may access or communicate with asset generators 103-1 with latency that is less than 10 milliseconds.

Second tier asset generators 103-2 may include mid-tier PoPs that are farther from the network edges than first tier asset generators 103-1. Accordingly, the latency associated with different groups of user devices accessing or communicating with second tier asset generators 103-2 may be between 10-25 milliseconds.

Third tier asset generators 103-3 may be located at the network core. As such, third tier asset generators 103-3 may be the greatest number of network hops away from the different groups of users. Latency associated with accessing third tier asset generators 103-3 may be greater than 25 milliseconds.

3D interactive system 100 has fewer number of mid-tier PoPs with second tier asset generators 103-2 than network edge PoPs with first tier asset generators 103-1 and fewer number of network core PoPs with third tier asset generators 103-3 than mid-tier PoPs because PoPs deeper in the network may service more groups of users than PoPs closer to the network edge with similar latency. Costs associated third tier asset generators 103-3 are lower than costs associated with first tier asset generators 103-1 because space within network edge PoPs is more expensive than space within a network core POP and because third tier asset generators 103-3 may be configured with lower performing or older hardware than tier asset generators 103-1.

Each asset generator 103 is one or more devices or machines with processor, memory, storage, network, and/or other hardware resources for generating, manipulating, transforming, modifying, adjusting, and/or otherwise processing 3D assets. For instance, asset generators 103 may include Graphical Processing Units (GPUs) that are optimized for generating and updating primitives of point clouds, mesh models, and/or 3D assets of other formats. Generating and updating the primitives includes changing the positioning and/or visual characteristics of the primitives in order to animate the 3D asset that is formed by the primitives or in response to user input or other simulated forces that modify the shape and visual appearance of the 3D asset.

In some embodiments, asset generators 103 define and store a base model for different 3D assets, and apply transformations, animations, and/or effects to move or manipulate the base model in response to different user inputs. For instance, asset generators 103 may store or generate a 3D asset for a playable character, and may adjust the primitives of the 3D assets according to a physics engine to simulate lifelike movements or interactions with other objects. In some embodiments, asset generators 103 may store the primitives that define or form a 3D asset and may also store an animation framework for that 3D asset. Asset generators 103 may transform or adjust the primitives according to the animation framework and an animation caused by a user input. For instance, an asset generator 103 may receive a first input to cause the 3D asset to walk, and asset generator 103 may update the primitives of the 3D asset according to the animation framework to generate the walking animation in response to the first input. Asset generator 103 may receive a second input to cause the 3D asset to jump, and asset generator 103 may update the primitives of the 3D asset according to the animation framework to generate the jumping animation. In each instance, updating the primitives includes changing the positioning or visual characteristics of the primitives to create the desired animation. Updating the primitives may include removing some primitives or adding new primitives to the 3D asset.

In some embodiments, asset generators 103 track a last state generated for each 3D asset. The last state corresponds to the last adjusted positions and visual characteristics for the primitives forming the 3D asset. Asset generators 103 update a 3D asset by applying different transformations, adjustments, or other changes to the last adjusted positions and visual characteristics that are defined in response to newly received user input, continued issuance of user input, animation models defined for animating the 3D asset, and/or other data that produces the update 3D asset state.

In some embodiments, asset generators 103 update the primitives of a 3D asset in response to movements, actions, or other animations defined for that 3D asset by AI. For instance, the 3D asset may represent a non-playable character that is controlled by AI. Asset generator 103 may generate and/or update the primitives of the 3D asset based on instructions provided by the AI for autonomously controlling the 3D asset in the interactive 3D content.

Each asset generator 103 may be assigned and/or accessed via a different unicast network address or Internet Protocol (IP) address. Controller 101 may assign the tasks for generating and updating different 3D assets to different asset generators 103 using the different addressing. In some embodiments, a group of asset generators 103 located in the same POP may be accessed via a common network address.

Figure 2:
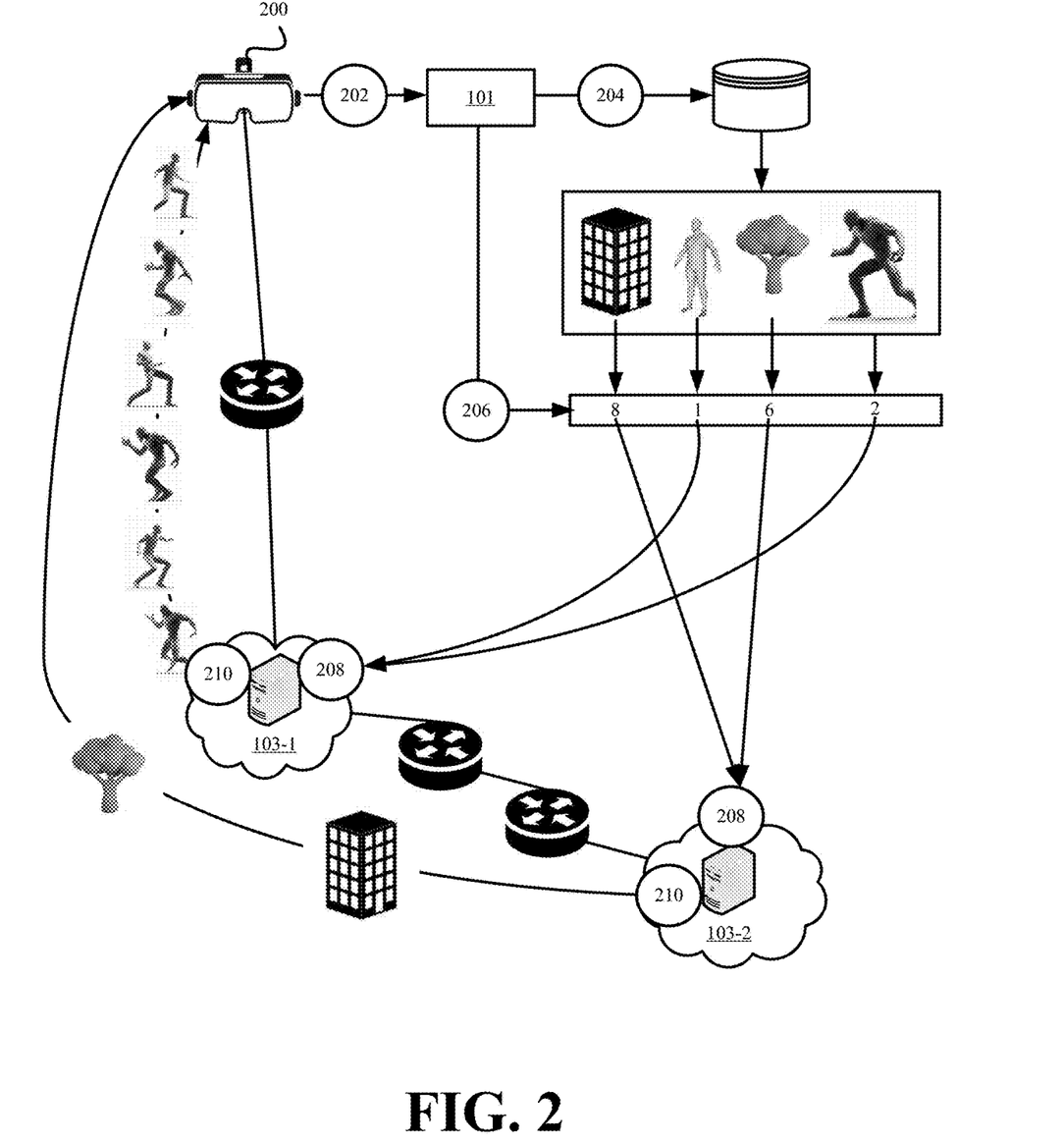
FIG. 2 illustrates an example of controlling the allocation of asset generators for the distributed generation and updating of 3D assets in a 3D scene in accordance with some embodiments presented herein.

FIG. 2 illustrates an example of controller 101 controlling the allocation of asset generators 103 for the distributed generation and updating of 3D assets in a 3D scene in accordance with some embodiments presented herein. Controller 101 receives (at 202) a request to remotely access interactive 3D content from user device 200. The interactive 3D content may include a 3D video game, a spatial computing experience, and/or a 3D scene or environment that a user can move within or otherwise interact with using user inputs. User device 200 may include a device for remotely accessing and rendering the interactive 3D content from 3D interactive system 100. User device 200 may include a virtual reality, mixed reality, augmented reality, enhanced reality, or other spatial computing headset, gaming device, tablet, computer, or other device with network connectivity and resources for presenting 3D or spatial computing experiences.

Controller 101 identifies (at 204) a list of 3D assets that form the interactive 3D content. For instance, the list of 3D assets may identify point clouds or mesh models of different 3D objects that are presented in a single 3D space to form the interactive 3D content. The 3D assets may include 3D models or representations of characters, structures, background or foreground elements, and other interactive or non-interactive objects that are presented at different positions in the same 3D space. Each 3D asset is defined as a set of primitives. The set of primitives may include points, meshes, polygons, and/or constructs of other 3D formats that are used to define the shape, structure, and appearance of the 3D asset. The list of 3D assets may include the names, identifiers, positioning, importance, interactivity, and/or other usage data related to each 3D asset of the interactive 3D content.

In some embodiments, the list of 3D assets for the interactive 3D content may be stored in a manifest or definition file that is retrieved based on an identifier included in the request. In some other embodiments, the list of 3D assets may be stored in a folder, directory, or network path that is specified in the request for the interactive 3D content.

Controller 101 determines (at 206) a latency sensitivity for each 3D asset. In some embodiments, the latency sensitivity determination (at 206) may be based on a frequency with which the 3D asset is interacted with or modified as part of the interactive 3D content or based on whether the 3D asset may be controlled or interacted with. For instance, a 3D asset representing a playable character or a non-playable character in a game may be frequently updated as it moves within the interactive 3D content, and may be classified as a latency sensitive 3D asset as a result. Conversely, a 3D asset representing a non-interactive tree or building may not change or may receive infrequent or minor updates throughout the presentation of the interactive 3D content, and may be classified as a latency insensitive 3D asset as a result. In some other embodiments, the latency sensitivity determination (at 206) may be based on a position of the 3D asset in the interactive 3D content relative to a render position. For instance, 3D assets in the background or that are a threshold distance away from the render position may be classified as latency insensitive and 3D assets in the foreground or that are less than the threshold distance away from the render position may be classified as latency sensitive. In still some other embodiments, controller 101 may perform object recognition on a 3D asset to determine (at 206) whether the detected object is static or animated. In still some other embodiments, the latency sensitivity determination (at 206) may be based on other data that is retrieved with the 3D asset. 3D assets that include animation frameworks or that are defined with animations may be classified as latency sensitive, and 3D assets that are defined as static models and are not associated with any animation frameworks or animations may be classified as latency insensitive. Additionally, the 3D assets may include metadata that specifies the latency sensitivity of the 3D asset. For instance, the interactive 3D content creator or developer may specify the latency sensitive for each 3D asset based on the playability, interactivity, or importance of that 3D asset to the interactive 3D content.

Controller 101 assigns (at 208) the generation and updating of latency sensitive 3D assets to first tier asset generator 103-1 at the network edge, and the generation and updating of latency insensitive 3D assets to second tier asset generator 103-2 that is more network hops away from the requesting user device than first tier asset generators 103-1. Assigning (at 208) the 3D assets to the different asset generators 103 may include allocating the different asset generators 103 for the generation and updating of the 3D assets by selectively forwarding requests related to the generation and/or updating of the different 3D assets to the different asset generators 103 based on the latency sensitivity determined (at 206) for the different 3D assets. Assigning (at 208) the 3D assets may also include issuing a request with the name or identifier of a 3D asset that an asset generator is tasked with generating and/or updating to the IP address of that asset generator. In some embodiments, controller 101 tracks the assignment of 3D assets to asset generators 103 so subsequent requests related to updating a 3D asset or user input that affects that 3D asset are forwarded to the same asset generator 103 that generated the last state of the 3D asset.

Asset generators 103 generate and update (at 210) the 3D assets that controller 101 has assigned or allocated to them while the interactive 3D content is being accessed. Generating and/or updating (at 210) the 3D assets may include retrieving the primitives for a last defined state of an assigned 3D asset, and transforming or modifying one or more of the primitives to present a current or changing state of the 3D asset. The transformation or modifications may be associated with a defined animation for the 3D asset, may be generated based on AI-controlled or programmed movements of the 3D asset, or may be generated in response to a determined affect that user input has on the one or more primitives. For example, a first 3D asset assigned to first tier asset generator 103-1 may represent a playable character that is animated in response to user inputs, and a second 3D asset assigned to first tier asset generator 103-1 may represent a non-playable character that is controlled by AI and that the AI animates in response to user movements or movement of other 3D assets in the interactive 3D content.

First tier asset generator 103-1 and second tier asset generator 103-2 distribute the primitives (e.g., points, meshes, polygons, etc.) as they are generated and/or updated for the different assigned 3D assets to the user device 200 with different latency. In particular, user device 200 receives the updated primitives for the latency sensitive 3D assets from first tier asset generator 103-1 before the updated primitives for the latency insensitive 3D assets from second tier asset generator 103-2 due to the closer proximity and lower latency associated with first tier asset generator 103-1. In this manner, 3D interactive system 100 provides a responsive 3D experience by ensuring that 3D asset changes caused by the user input are presented with the lowest possible latency while updates to other 3D assets that are less time-critical or that do not require immediate feedback are presented with higher latency from less expensive resources of second or third tier asset generators 103.

Figure 3:
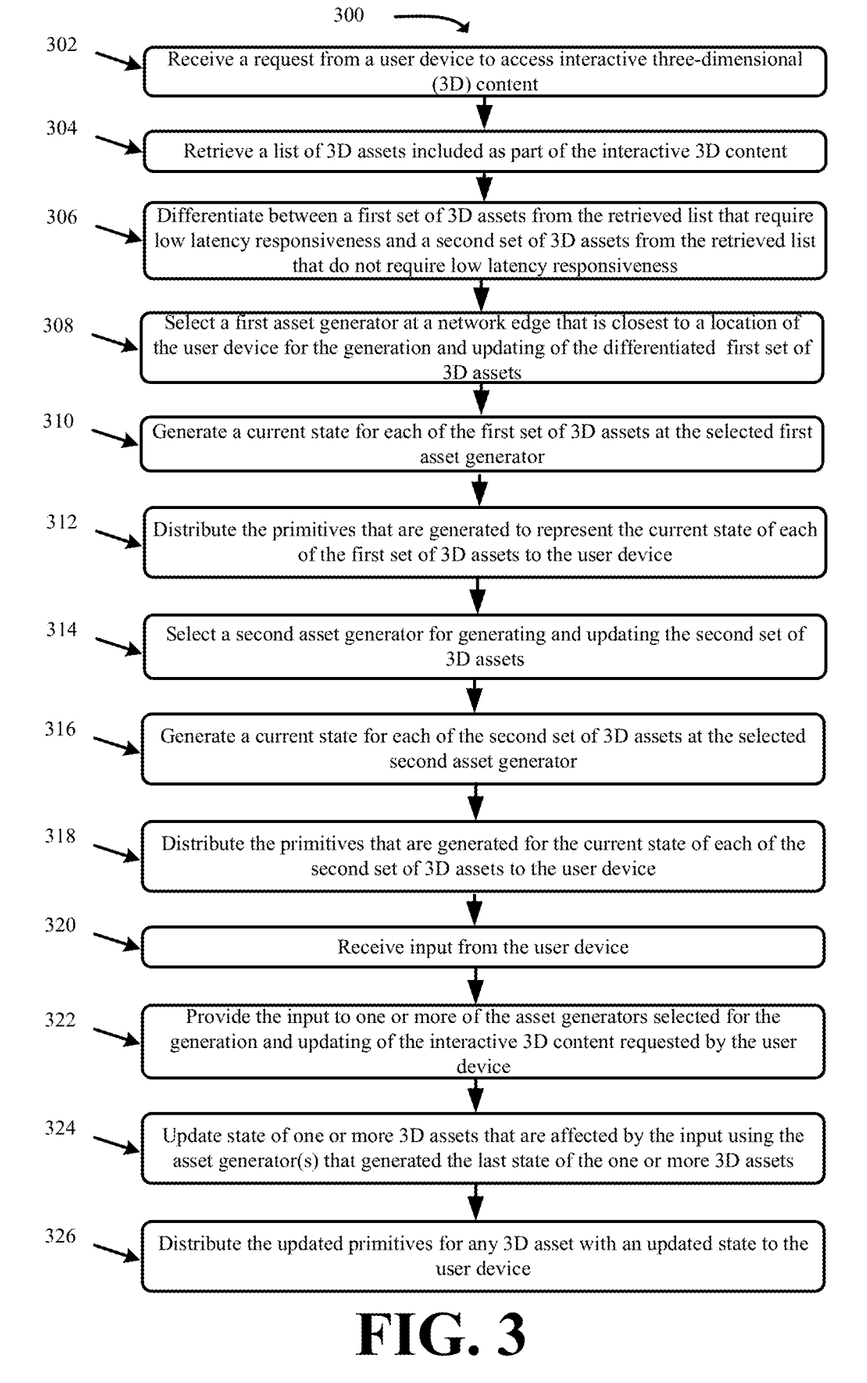
FIG. 3 presents a process for the distributed 3D content generation in accordance with some embodiments presented herein.

FIG. 3 presents a process 300 for the distributed 3D content generation in accordance with some embodiments presented herein. Process 300 is implemented by 3D interactive system 100 via the coordinated operation of controller 101 and asset generators 103 at different network tiers.

Process 300 includes receiving (at 302) a request from a user device to access interactive 3D content. The requested interactive 3D content may be identified in the Uniform Resource Locator (URL) of the request or another identifier provided with the request.

Process 300 includes retrieving (at 304) the list of 3D assets included as part of the interactive 3D content. 3D interactive system 100 may open a file that lists the 3D assets of the interactive 3D content or may access a folder, network path, or other repository where the list of 3D assets is found.

Process 300 includes differentiating (at 306) between a first set of 3D assets from the retrieved (at 304) list of 3D assets that are frequently updated or affected by user input and therefore require low latency responsiveness in the interactive 3D content and a second set of 3D assets from the retrieved (at 304) list of 3D assets that are infrequently updated or are not affected by user input and therefore latency insensitive. The differentiation (at 306) may be based on labels or metadata that are associated with each 3D asset or that are included in a file that specifies the latency sensitivity of each 3D asset. For instance, the 3D asset creators may specify the latency sensitivity of each 3D asset. The latency sensitivity of the 3D assets may also be determined by tracking the frequency with which each 3D asset is changed or updated in prior requests for the interactive 3D content or based on whether the 3D asset is associated with an animation framework, is controlled with user input, is AI controlled, is a static element, is placed in the foreground or background, and/or is associated with colliders or collision detection.

Process 300 includes selecting (at 308) a first asset generator at a network edge that is closest to a location of the user device and/or that is able to communicate with the user device with a first threshold amount of latency (e.g., less than 10 millisecond) for the generation and updating of the differentiated (at 306) first set of 3D assets. In some embodiments, the selection (at 308) of the first asset generator includes tracking a location of the user device based on geolocation data obtained from the user device, the network address or network path identified in the request, and/or other location tracking techniques, and determining that the first asset generator is at a network edge or POP that is closest to the tracked location of the user device. In some other embodiments, the selection (at 308) of the first asset generator includes controller 101 directing all asset generators or asset generators at different network edges to ping or otherwise measure the latency to the user device, and determining which asset generator has the lowest latency network path to the user device based on the latency measurements. Controller 101 may select (at 308) multiple first asset generator from the same edge PoP to generate and/or update different 3D assets from the first set of 3D assets. For optimal performance, controller 101 may allocate a different first asset generator to generate and/or update a single 3D asset from the first set of 3D assets. In this manner, the selected (at 308) first asset generators may generate and/or update the first set of 3D assets in parallel.

The selection (at 308) of the first asset generator also includes assigning or allocating the differentiated (at 306) first set of 3D assets to the first asset generator for generation and updating. For instance, controller 101 may provide the selected (at 308) first asset generator with the names, links, paths, or other identifiers for retrieving the primitives and/or other data associated with each 3D asset in the first set of 3D assets.

Process 300 includes generating (at 310) a current state for each of the first set of 3D assets at the first asset generator. Generating (at 310) the current state for each of the first set of 3D assets may include retrieving the primitives for each 3D asset of the first set of 3D assets and applying a first set of transformations to the primitives in order to present the first set of 3D assets at the current state. For instance, the first set of 3D assets may be defined or stored at a first size, first resolution, first orientation, or first configuration (e.g., pose, animation position, shape, etc.), and generating (at 310) the current state for each of the first set of 3D assets may include adjusting the first set of 3D assets to present them at a second size, second resolution, second orientation, or second configuration specified for an initial presentation of the interactive 3D content.

Process 300 includes distributing (at 312) the primitives that are generated (at 310) to represent the current state of each of the first set of 3D assets to the user device. In some embodiments, the first asset generator directly transmits the primitives for the current state of each of the first set of 3D assets to the user device. In some other embodiments, the first asset generator passes the primitives to controller 101, and controller 101 forwards the primitives to the user device.

Process 300 includes selecting (at 314) a second asset generator for generating and updating the second set of 3D assets. Controller 101 selects (at 314) the second asset generator at a mid-tier location or network core location that incurs greater latency to communicate with user device than the first asset generator. However, usage of the second asset generator resources is less expensive than usage of the first asset generator resources because the resources are not located at costly network edge sites and because the latency tolerant second set of 3D assets may be generated with older or less expensive hardware than the latency sensitive first set of 3D assets without impacting the overall user experience or the interactive 3D content. In some embodiments, controller 101 may select multiple second asset generators to generate and/or update different 3D asset from the second set of 3D assets.

Process 300 includes generating (at 316) a current state for each of the second set of 3D assets at the selected (at 314) second asset generator, and distributing (at 318) the primitives that are generated (at 316) for the current state of each of the second set of 3D assets to the user device. The distribution (at 312 and 318) of the primitives for the first set of 3D assets and the second set of 3D assets may occur at different times because of the latency and resource discrepancy between the first asset generator and the second asset generator. For instance, each asset generator may distribute the primitives of each 3D asset to the user device as they are generated since the primitives may be rendered individually without referencing other primitives of the same or different 3D asset of the interactive 3D content. In other words, each primitive for each 3D asset may be defined with all the data that is needed to render a visualization in a 3D space. For instance, each primitive may be defined with positional data and visual characteristic data, wherein the positional data defines the position and shape of the primitive in a 3D space and the visual characteristic data defines the colors and visual appearance for the shape at the defined position.

Process 300 includes receiving (at 320) input from the user device. In some embodiments, controller 101 receives (at 320) the input from the user device. In some such embodiments, controller 101 may serve as the endpoint from which the user device receives the generated primitives of the 3D assets and to which the user device provides input for manipulating the interactive 3D content.

The input may be generated from a controller, keyboard, mouse, trackpad, touch-based input device, motion tracking sensor, and/or other device or sensor that generate input. The input may include changing the field-of-view or render position within the interactive 3D content. The input may also include performing an action within the interactive 3D content. For instance, the input may include touching a virtual object, firing a virtual weapon, or causing a playable character to perform an action (e.g., punch, jump, crouch, etc.). In any case, the input may cause the interactive 3D content or one or more 3D assets of the interactive 3D content to change.

Process 300 includes providing (at 322) the input to one or more of the asset generators selected (at 308 and 314) for the generation and updating of the interactive 3D content requested by the user device. In some embodiments, controller 101 broadcasts or distributes the input to all selected asset generators for the interactive 3D content (e.g., the first asset generator and the second asset generator). In some other embodiments, controller 101 analyzes the input to determine the one or more 3D assets that are affected by the input, and selectively provides (at 322) the input to the asset generators that were selected to generate and/or update those one or more 3D assets. For instance, the input may specify a playable character movement. Controller 101 determines that the 3D asset for the playable character is assigned to the first asset generator, and provides (at 322) the input to the first asset generator and not the second asset generator. Alternatively, the input may specify an action for interacting with one of the second set of 3D assets, and controller 101 may provide (at 322) the input to the second asset generator or to the first asset generator and the second asset generator when the action is performed by one of the first set of 3D assets and affects or interacts with one of the second set of 3D assets.

Process 300 includes updating (at 324) state of one or more 3D assets that are affected by the input using the asset generator(s) that generated the last state of the one or more 3D assets. Updating (at 324) the state of a particular 3D asset with a particular asset generator includes retrieving the last state that the particular asset generator generated for the particular 3D asset, transforming, manipulating, adjusting, animating, or otherwise editing the primitives from the last state of the particular 3D asset according to the user input, and generating updated primitives for the current state of the particular asset. The updated primitives may have different positions, vertices, shapes, and/or visual characteristics than the primitives of the last state. Generating the updated primitives may also include removing one or more primitives of the last state or adding one or more new primitives to the primitives of the last state. In other words, the particular asset generator determines the effect that the input has on the particular 3D asset, and adjusts the primitives of the particular 3D asset to generate a visualization of the effect.

The asset generators may also perform logic to determine what effects or changes the user input has on an assigned 3D asset. For instance, asset generators may perform collision detection in order to determine if the user input interacts with a 3D asset, and may update the primitives of the 3D asset in response to detecting a collision and computations for the effect that the collision or interaction has on the shape, position, visual characteristics, and/or other properties of the 3D asset.

In some embodiments, the state of one or more 3D assets may be updated (at 324) independent of the input. For instance, one or more of the asset generators may be tasked with generating and updating (at 324) non-playable characters or animations in the interactive 3D content. The non-playable characters may be controlled by AI and the updated motions and/or actions of the non-playable characters may be generated by the AI in response to motions and/or actions of other 3D assets. Similarly, a 3D asset may be associated with a specific animation that occurs at a specific time in the interactive 3D content. For instance, a 3D asset for a bus or train may be defined with an animation to move in a particular direction along a particular path in the interactive 3D content, and the asset generator tasked with the animation of the 3D asset may update (at 324) the 3D asset for the bus or train according to the specified time, particular direction, and particular path irrespective of the user input.

Process 300 includes distributing (at 326) the updated primitives for any 3D asset with an updated state to the user device. In some embodiments, each asset generator distributes (at 326) the updated primitives as they are generated to the user device or to controller 101 for forwarding from a single endpoint to the user device. The user device may incorporate the updated primitives into the interactive 3D content and render the changes represented by the updated primitives rather than render the entirety of the interactive 3D content or all primitives for all 3D assets of the interactive 3D content at a specific frame rate.

The updated primitives may include identifiers or indices that relate back to primitives of a last 3D asset. Specifically, the identifier or index for an updated primitive identifies the primitive from the 3D asset last state that is being updated or replaced by the updated primitive. Accordingly, the user device may remove the rendered visualization for the last state of the identified primitive and may generate a new rendered visualization based on the positional data and visual characteristics of the updated primitive. Updated primitives with null values may indicate that previously rendered primitives for a last state of the 3D asset should be removed. Updated primitives with identifiers or indices that do not match identifiers or indices of primitives from a last 3D asset state may correspond to new primitives that add new visual detail to the rendering of the 3D asset. The user device may use the identifiers and indices to perform a partial rendering or to update parts of the 3D asset visualization rather than render all primitives of the 3D asset at a particular frame rate.

By distributing the updated primitives and having the user device render the interactive 3D content, 3D interactive system 100 significantly lowers the amount of bandwidth that is used to transfer the interactive 3D content relative to other streaming systems that render all primitives of the interactive 3D content at a specific frame rate and send the image data for each generated video frame at the specific frame rate over the network to the user device. Instead, 3D interactive system 100 sends the data associated with the updated primitives which is significantly less than the data for all the primitives of the 3D assets in the interactive 3D content.

Figure 4:
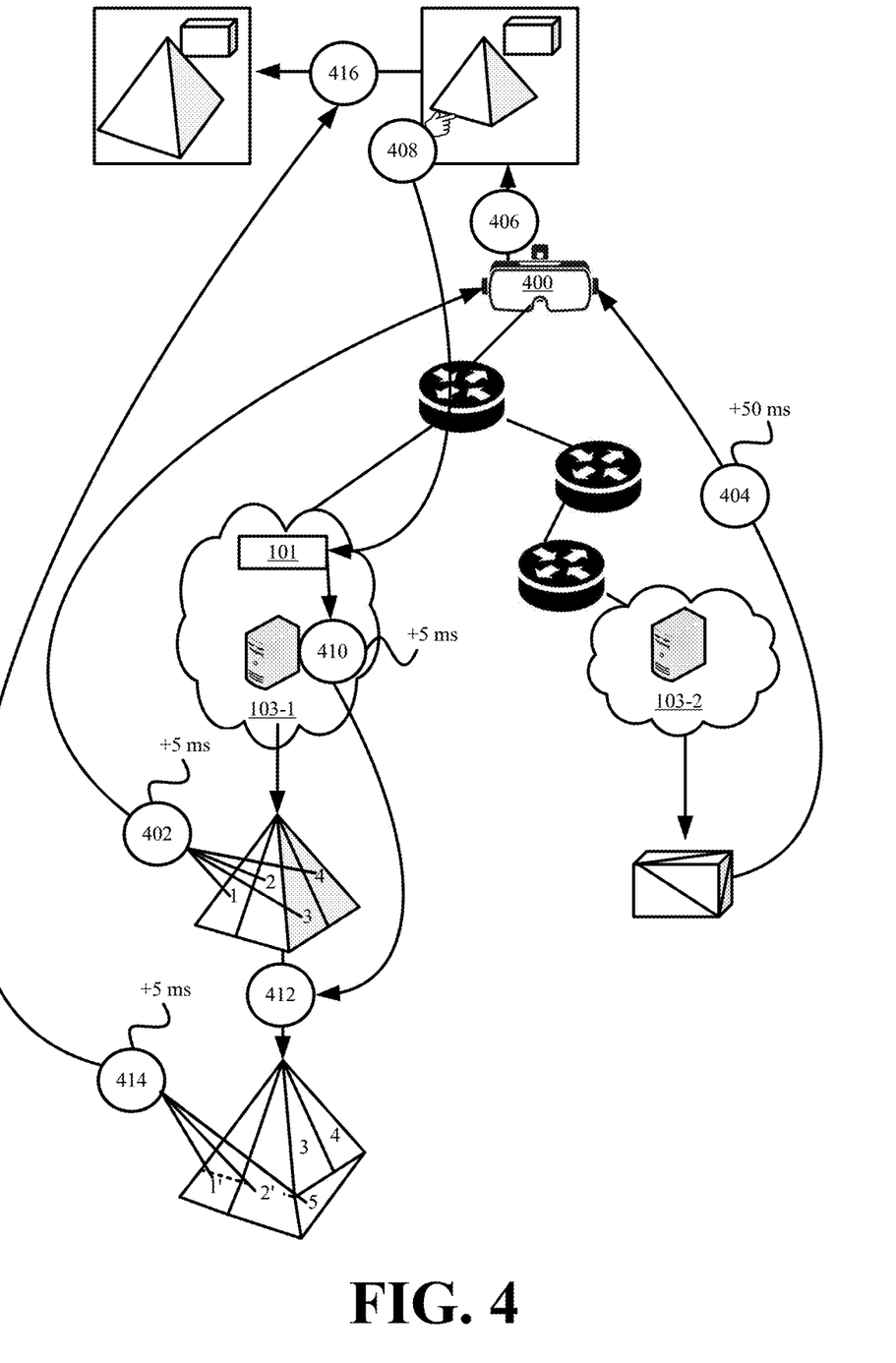
FIG. 4 illustrates an example of distributed asset generators generating and updating 3D assets for the same interactive 3D content with different latencies in accordance with some embodiments presented herein.

FIG. 4 illustrates an example of distributed asset generators generating and updating 3D assets for the same interactive 3D content with different latencies in accordance with some embodiments presented herein. First asset generator 103-1 is at a low latency PoP and is tasked with generating and modifying the primitives for a frequently updated first 3D asset of the interactive 3D content. Second asset generator 103-2 is at a high latency PoP and is tasked with generating and modifying the primitives of an infrequently updated second 3D asset of the interactive 3D content.

First asset generator 103-1 generates and distributes (at 402) primitives for a first state of the first 3D asset to user device 400 with a first latency. As shown in FIG. 4, first asset generator 103-1 generates first, second, third, and fourth primitives to represent the first state of the first 3D asset.

Second asset generator 103-2 generates and distributes (at 404) primitives for a second state of the second 3D asset to user device 400 with a second latency that is greater than the first latency.

User device 400 renders the primitives as they are received to generate (at 406) a first visualization of the interactive 3D content. User device 400 receives (at 408) a user input for interacting with the first 3D asset.

The low latency responsiveness of first asset generator 103-1 is needed to update the first 3D asset in a near real-time manner (e.g., generate and distribute updates to the first 3D asset in under 20 milliseconds). Accordingly, first asset generator 103-1 receives (at 410) the user input directly or indirectly from user device 400, and updates (at 412) the primitives of the first 3D asset based on a computed effect that the user input has on the first state primitives of the first 3D asset. Specifically, first asset generator 103-1 applies changes that the user input has on the size, shape, positioning, coloring, and/or other visual properties of the first 3D asset primitives, and generates a modified first primitive, a modified second primitive, and a new fifth primitive to represent the second state of the first 3D asset with the unmodified third and fourth primitives of the first state. First asset generator 103-1 distributes (at 414) the updated primitives (e.g., the modified first primitive, the modified second primitive, and the new fifth primitive) for the first 3D asset to user device 400.

User device renders (at 416) the updated primitives to change the affected region or parts of the first 3D asset visualization. Due to the low latency communication between first asset generator 103-1 and user device 400, the visualization for the first 3D asset in the interactive 3D content may be updated in near real-time manner with no perceptible delay or lag even though the changes to the first 3D asset are made by first asset generator 103-1 and communicated to user device 400. As a result, the effects of the user input on the first 3D asset appear instantaneous.

Second asset generator 103-2 may also update the primitives of the second 3D asset in response to the user input, a specified animation, programmed logic, or AI-defined changes. The greater latency associated with communications between second asset generator 103-2 and user device 400 may result in the updated primitives of the second 3D asset arriving after the updated primitives of the first 3D asset. Accordingly, the visual updates to the second 3D asset may be slightly delayed relative to the visual updates to the first 3D asset. The delay is inconsequential when the second 3D asset is indirectly affected by the user input or is updated independent of the user input. For instance, the user input may control movements of the first 3D asset such that the real-time or immediate translation of the user input into the corresponding movements of the first 3D asset are expected for a seamless experience. Meanwhile, the second 3D asset may be animated independent of the first 3D asset such that the delay updating of the second 3D asset relative to the first 3D asset has no effect on the overall user experience.

Figure 5:
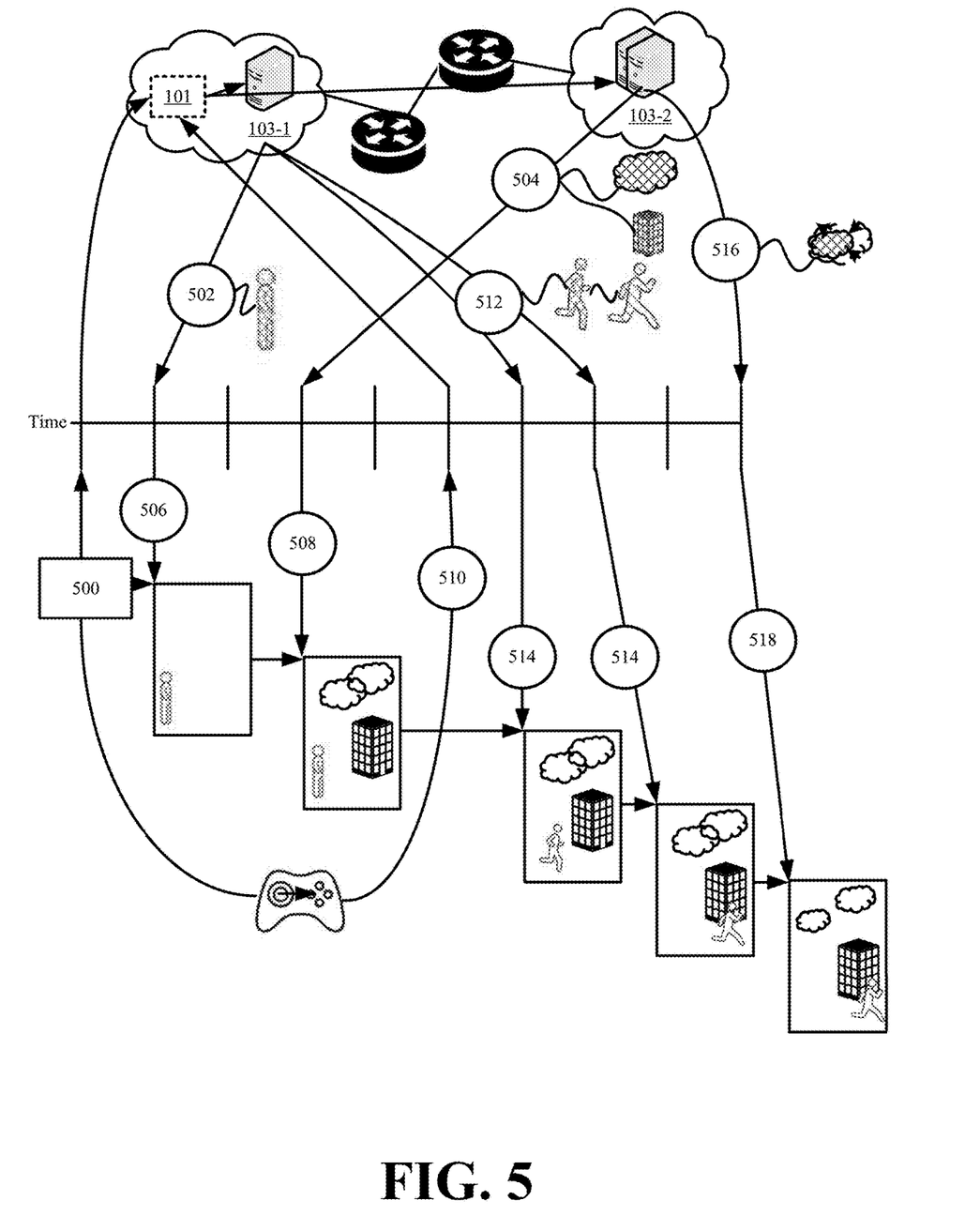
FIG. 5 illustrates an example of a user device rendering an interactive 3D content based on different latencies with which the primitives for different 3D assets of the interactive 3D content are received from the asset generators in accordance with some embodiments presented herein.

FIG. 5 illustrates an example of a user device rendering an interactive 3D content based on different latencies with which the primitives for different 3D assets of the interactive 3D content are received from the asset generators of 3D interactive system 100 in accordance with some embodiments presented herein. User device 500 receives (at 502) primitives of a first 3D asset from first asset generator 103-1 at a low latency POP before receiving (at 504) primitives of a second set of latency tolerant 3D assets from second asset generator 103-2 at a high latency PoP.

User device 500 renders (at 506) the primitives of the first 3D asset to generate a visualization of the first 3D asset. Rendering (at 506) the primitives may include generating a visual representation for each primitive of the first 3D asset at a position in a 3D space defined by coordinates of the primitive and with visual characteristics (e.g., colors, transparency, reflectivity, etc.) defined by non-positional elements of the primitive or various textures and maps associated with the primitives. In some embodiments, rendering (at 506) the primitives includes converting the 3D positioning to a two-dimensional (2D) plane and defining pixels for one or more frames of the interactive 3D content based on the conversion.

User device 500 renders (at 508) the primitives of the second set of latency tolerant 3D assets as they are received to supplement the interactive 3D content. Specifically, each primitive or 3D asset of the interactive 3D content may be rendered independent of one another, and the visual representation generated from each primitive or 3D asset may be added to the overall visualization of the interactive 3D content at different times.

User device 500 may provide (at 510) user input to 3D interactive system 100. The user input is forwarded to one or more of first asset generator 103-1 and second asset generator 103-2. In response, user device 500 receives (at 512) updated primitives for the first 3D asset from first asset generator 103-1. Rather than render all primitives for all 3D assets and regenerate the entire visualization of the interactive 3D content anew at each frame of a specified frame rate, user device 500 renders (at 514) the updated primitives as they arrive, and updates one or more regions of the interactive 3D content visualization that are affected or represented by the updated primitives.

Second asset generator 103-2 may update (at 516) primitives of one or more of the second set of latency tolerant assets at a delayed rate relative to the updating of the latency sensitive first 3D asset. Second asset generator 103-2 may provide the updated primitives for the second set of latency tolerant assets to user device 500, and user device 500 may again update (at 518) the visualization for the interactive 3D content in response to the changes contained by the updated primitives of the second set of latency tolerant assets.

Figure 6:
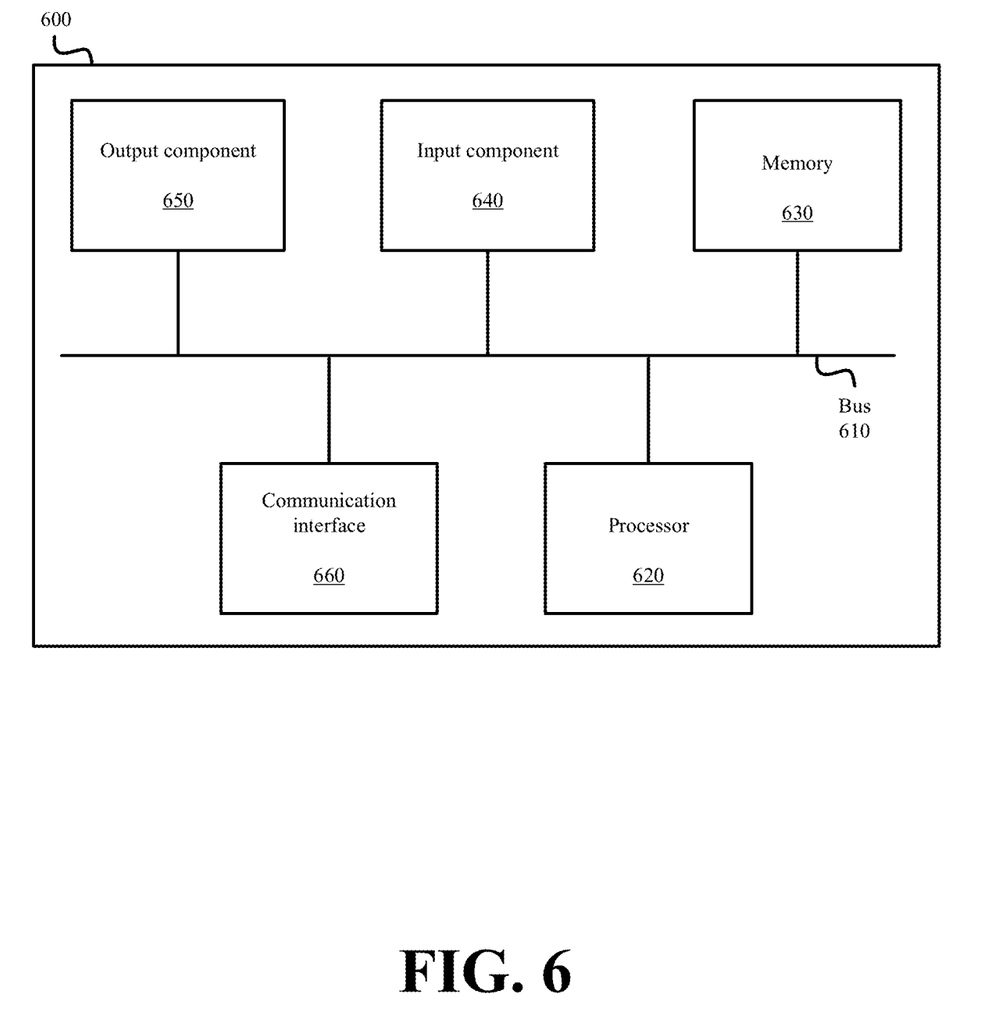
FIG. 6 illustrates example components of one or more devices, according to one or more embodiments described herein.

FIG. 6 is a diagram of example components of device 600. Device 600 may be used to implement one or more of the tools, devices, or systems described above (e.g., 3D interactive system 100, controller 101, asset generators 103, etc.). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more LEDs, etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
  receiving a request for a three-dimensional (3D) scene from a user device, wherein the 3D scene comprises a plurality of 3D assets;
  determining a first 3D asset from the plurality of 3D assets that is latency sensitive and a second 3D asset from the plurality of 3D assets that is latency tolerant;
  generating different states of the first 3D asset with a first asset generator that communicates with the user device with a first amount of latency that is less than a threshold;
  generating different states of the second 3D asset with a second asset generator that communicates with the user device with a second amount of latency that is greater than the threshold; and
  distributing primitives related to the different states of the first 3D asset from the first asset generator to the user device with the first amount of latency and primitives related to the different states of the second 3D asset from the second asset generator to the user device with the second amount of latency.

2. The method of claim 1, wherein said determining comprises:
   determining that the first 3D asset is affected by user input; and
   determining that the second 3D asset is not affected by the user input.

3. The method of claim 1, wherein said determining comprises:
   determining that the first 3D asset changes between the different states at a first frequency; and
   determining that the second 3D asset changes between the different states at a second frequency that is less than the first frequency.

4. The method of claim 1 further comprising:
   deploying the first asset generator to a network edge location that is a first number of network hops away from a location of the user device; and
   deploying the second asset generator to a network location that is a second number of network hops away from the location of the user device, wherein the second number of network hops is greater than the first number of network hops.

5. The method of claim 1 further comprising:
   determining a location of the user device; and
   allocating the first 3D asset to the first asset generator in response to a location of the first asset generator being closer to the location of the user device than the second asset generator and other asset generators.

6. The method of claim 1 further comprising:
   receiving an input from the user device;
   determining that the input affects the first 3D asset and not the second 3D asset;
   forwarding the input to the first asset generator; and
   changing a state of the first 3D asset based on the input, wherein changing the state comprises updating one or more primitives that were generated for a last state of the first 3D asset.

7. The method of claim 1, wherein generating the different states of the first 3D asset comprises:
   updating one or more primitives that were generated for a last state of the first 3D asset at the first asset generator; and
   distributing the one or more primitives that were updated by the first asset generator to the user device with the first amount of latency without redistributing other primitives of the last state that were not updated.

8. The method of claim 7, wherein generating the different states of the second 3D asset comprises:
   updating one or more primitives that were generated for a last state of the second 3D asset at the second asset generator; and
   distributing the one or more primitives that were updated by the second asset generator to the user device with the second amount of latency.

9. The method of claim 7, wherein updating the one or more primitives comprises:
   receiving a user input from the user device;
   determining changes that the user input causes to the first 3D asset; and
   applying the changes by modifying a position, shape, or visual characteristics of the one or more primitives.

10. The method of claim 1 further comprising:
    retrieving a listing of the plurality of 3D assets in response to receiving the request; and
    wherein said determining comprises:
    determining that the first 3D asset is latency sensitive based on a first label associated with the first 3D asset in the listing; and
    determining that the second 3D asset is latency tolerant based on a second label associated with the second 3D asset in the listing.

11. The method of claim 1, wherein said determining comprises:
    prioritizing each 3D asset from the plurality of 3D assets based on tracked state changes associated with each 3D asset in a prior access of the 3D scene.

12. The method of claim 1 further comprising:
    assigning the first 3D asset to the first asset generator in response to determining that the first 3D asset is latency sensitive and the first amount of latency associated with the first asset generator being less than latency associated with other asset generators; and
    assigning the second 3D asset to the second asset generator in response to determining that the second 3D asset is latency tolerant and the second amount of latency associated with the second asset generator being greater than the first amount of latency.

13. The method of claim 1, wherein each 3D asset of the plurality of 3D assets corresponds to one of a point cloud, mesh model, or another 3D definition of an object.

14. A system comprising:
    a controller comprising one or more hardware processors configured to:
      receive a request for a three-dimensional (3D) scene from a user device, wherein the 3D scene comprises a plurality of 3D assets; and
      determine a first 3D asset from the plurality of 3D assets that is latency sensitive and a second 3D asset from the plurality of 3D assets that is latency tolerant; and
    a plurality of asset generators at different network locations, wherein the plurality of asset generators are configured to:
      generate different states of the first 3D asset with a first asset generator of the plurality of asset generators that communicates with the user device with a first amount of latency that is less than a threshold;
      generate different states of the second 3D asset with a second asset generator of the plurality of asset generators that communicates with the user device with a second amount of latency that is greater than the threshold; and
      distribute primitives related to the different states of the first 3D asset from the first asset generator to the user device with the first amount of latency and primitives related to the different states of the second 3D asset from the second asset generator to the user device with the second amount of latency.

15. The system of claim 14, wherein said determining comprises:
    determining that the first 3D asset is affected by user input; and
    determining that the second 3D asset is not affected by the user input.

16. The system of claim 14, wherein said determining comprises:
    determining that the first 3D asset changes between the different states at a first frequency; and
    determining that the second 3D asset changes between the different states at a second frequency that is less than the first frequency.

17. The system of claim 14, wherein the one or more hardware processors are further configured to:
  determine a location of the user device; and
  allocate the first 3D asset to the first asset generator in response to a location of the first asset generator being closer to the location of the user device than the second asset generator and other asset generators.

18. The system of claim 14,
  wherein the one or more hardware processors are further configured to:
    receive an input from the user device;
    determine that the input affects the first 3D asset and not the second 3D asset; and
    forward the input to the first asset generator;
  wherein the first asset generator is further configured to:
    change a state of the first 3D asset based on the input, wherein changing the state comprises updating one or more primitives that were generated for a last state of the first 3D asset.

19. The system of claim 14, wherein generating the different states of the first 3D asset comprises:
  updating one or more primitives that were generated for a last state of the first 3D asset at the first asset generator; and
  distributing the one or more primitives that were updated by the first asset generator to the user device with the first amount of latency without redistributing other primitives of the last state that were not updated.

20. A non-transitory computer-readable medium storing instructions that, when executed by one or more processors of a three-dimensional (3D) interactive system, cause the 3D interactive system to perform operations comprising:
  receiving a request for a 3D scene from a user device, wherein the 3D scene comprises a plurality of 3D assets;
  determining a first 3D asset from the plurality of 3D assets that is latency sensitive and a second 3D asset from the plurality of 3D assets that is latency tolerant;
  generating different states of the first 3D asset with a first asset generator that communicates with the user device with a first amount of latency that is less than a threshold;
  generating different states of the second 3D asset with a second asset generator that communicates with the user device with a second amount of latency that is greater than the threshold; and
  distributing primitives related to the different states of the first 3D asset from the first asset generator to the user device with the first amount of latency and primitives related to the different states of the second 3D asset from the second asset generator to the user device with the second amount of latency.

* * * * *